(12) United States Patent
Imai

(10) Patent No.: US 9,059,924 B2
(45) Date of Patent: Jun. 16, 2015

(54) INFORMATION PROCESSING APPARATUS, INFORMATION PROCESSING METHOD, AND A COMPUTER-READABLE RECORDING MEDIUM RECORDING INFORMATION PROCESSING PROGRAM

(71) Applicant: FUJITSU LIMITED, Kawasaki-shi, Kanagawa (JP)

(72) Inventor: Satoshi Imai, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 14/063,768

(22) Filed: Oct. 25, 2013

(65) Prior Publication Data
US 2014/0160982 A1   Jun. 12, 2014

(30) Foreign Application Priority Data

Dec. 7, 2012  (JP) ................. 2012-268418

(51) Int. Cl.
*H04L 12/24*   (2006.01)
*H04W 52/02*   (2009.01)

(52) U.S. Cl.
CPC ............. *H04L 41/12* (2013.01); *H04L 41/145* (2013.01); *H04W 52/0219* (2013.01); *H04L 41/0833* (2013.01); *H04W 52/0206* (2013.01); *Y02B 60/50* (2013.01)

(58) Field of Classification Search
CPC ..... H04L 41/12; H04L 41/0833; H04L 41/145; H04W 52/0206; H04W 52/0219
USPC .......................... 370/254, 237, 238
See application file for complete search history.

(56) References Cited

U.S. PATENT DOCUMENTS 8,199,672 B1 *  6/2012  Nachum et al. ............... 370/254
2011/0185052 A1 *  7/2011  Nakahira ...................... 709/223

FOREIGN PATENT DOCUMENTS

JP    2010-161501    7/2010

* cited by examiner

*Primary Examiner* — Mohammad Anwar
(74) *Attorney, Agent, or Firm* — Fujitsu Patent Center

(57) ABSTRACT

An information processing apparatus in a network system that includes first network apparatuses that establish logical topologies and second network apparatuses that connect to the first network apparatuses and that establish physical topologies. The information processing apparatus includes a first storage unit that stores traffic amounts of paths between the first network apparatuses; a second storage unit that stores power consumption for connections between the first and second network apparatuses; and a calculation unit that calculates, for logical topologies, sums of power consumption related to a packet forwarding process in the first network apparatuses and power consumption related to the connections between the first and second network apparatuses. The calculation unit selects a logical topology with the smallest sum among the logical topologies.

8 Claims, 19 Drawing Sheets

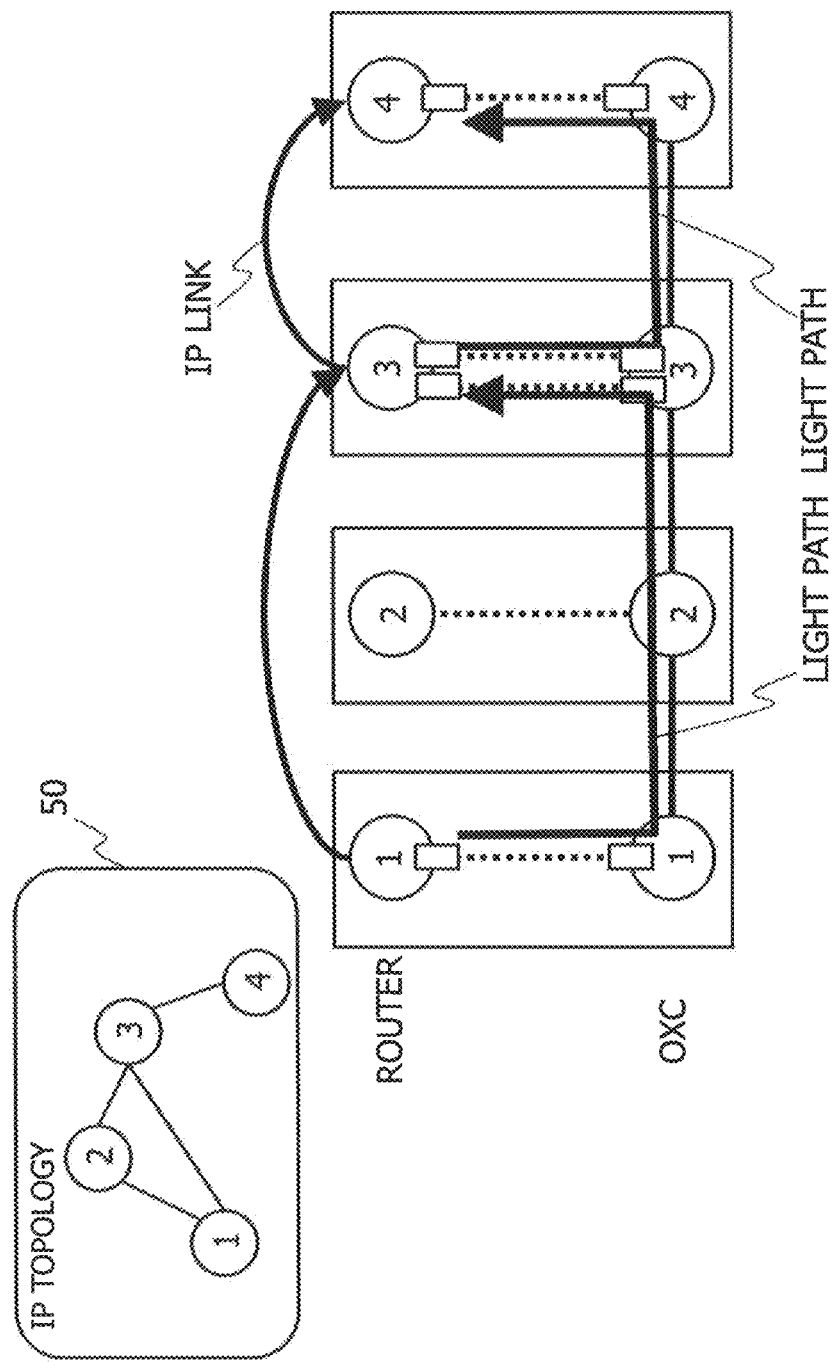

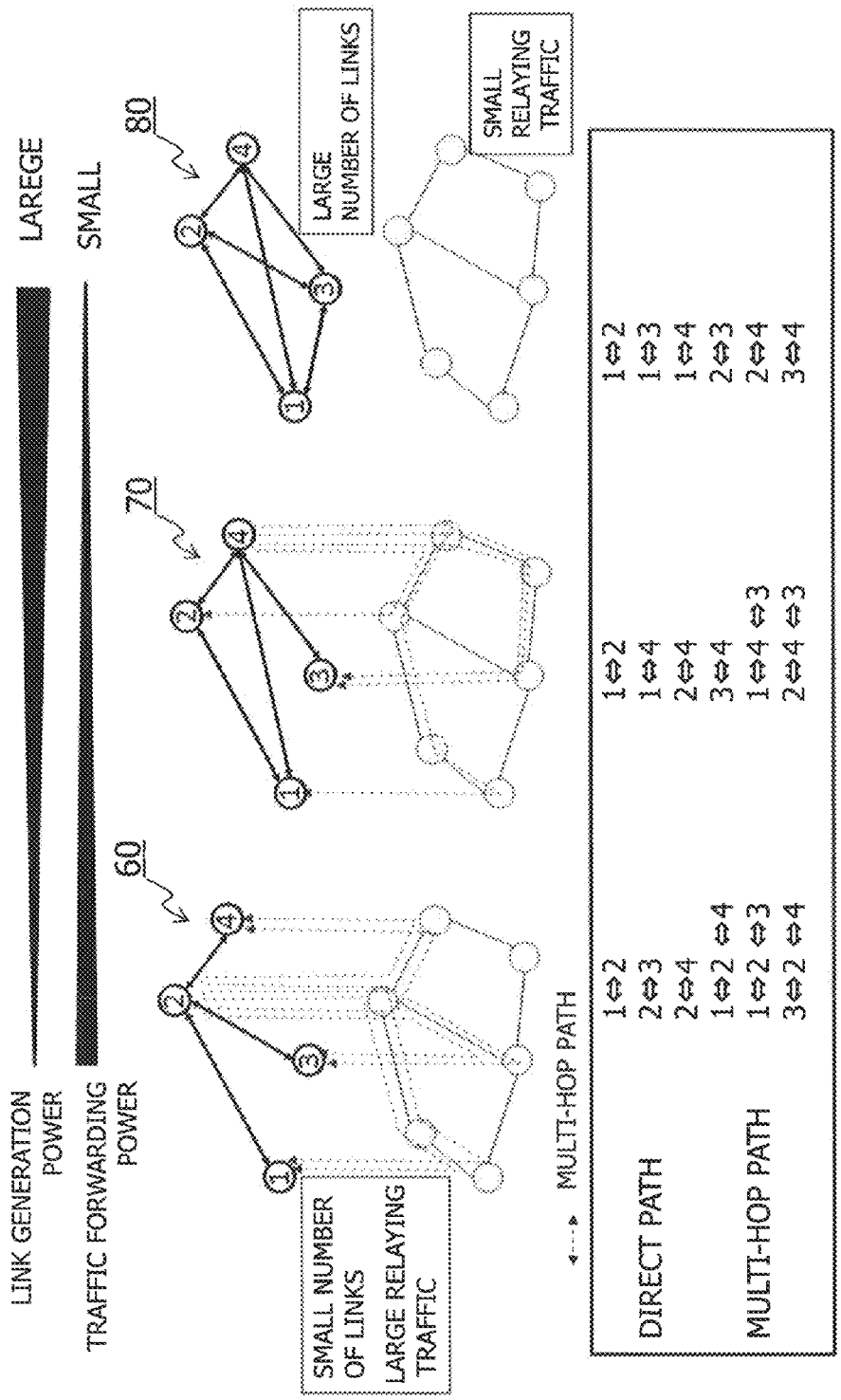

FIG.6

TRAFFIC MATRIX (Gbps)

| FROM(POINT) \ TO(POINT) | #1 | #2 | #2 | | | | #n-2 | #n-1 | #n |
|---|---|---|---|---|---|---|---|---|---|
| #1 |  | 3.2 | 1 | | | | 5.4 | 2.1 | 3.3 |
| #2 | 1.6 |  | 3.5 | | | | 4.2 | 2.3 | 8.1 |
| #3 | 1.8 | 4.1 | | | | | 1.1 | 4.2 | 4.8 |
| | | | | | | | | | |
| | | | | | | | | | |
| | | | | | | | | | |
| #n-2 | 1.2 | 6.1 | | | | | | | |
| #n-1 | 0.5 | 1.9 | | | | | 3.1 | | 9.1 |
| #n | 8.1 | 8.3 | 9.1 | | | | 4.1 | 8.7 | |

IP TOPOLOGY

EXAMPLE: LIGHT PATH NOT FORMED 1 → 4

POINT-TO-POINT TRAFFIC AMOUNT :1Gpbs
LINK GENERATION POWER PARAMETER :30 [W/LINK]
TRAFFIC FORWARDING POWER PARAMETER :5 [W/bps]

LINK GENERATION POWER :90 [W]
TRAFFIC FORWARDING POWER :150 [W]
TOPOLOGY POWER CONSUMPTION : 240 [W]

| FROM \ TO | #1 | #2 | #3 | #4 |
|---|---|---|---|---|
| #1 |  | 1 | 0 | null |
| #2 | 1 |  | 1 | 1 |
| #3 | 0 | 1 |  | 0 |
| #4 | null | 1 | 0 |  |

GENE 1: | 1 | 0 | 1 | 1 | 0 |

FIG. 7B
IP TOPOLOGY
EXAMPLE: LIGHT PATH NOT FORMED 1 → 4
POINT-TO-POINT TRAFFIC AMOUNT :1Gpbs
LINK GENERATION POWER PARAMETER :30 [W/LINK]
TRAFFIC FORWARDING POWER PARAMETER :5 [W/bps]
LINK GENERATION POWER :120 [W]
TRAFFIC FORWARDING POWER :140 [W]
TOPOLOGY POWER CONSUMPTION : 260 [W]
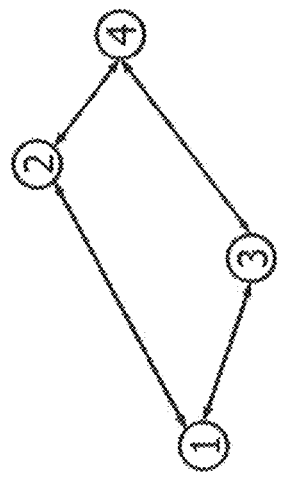
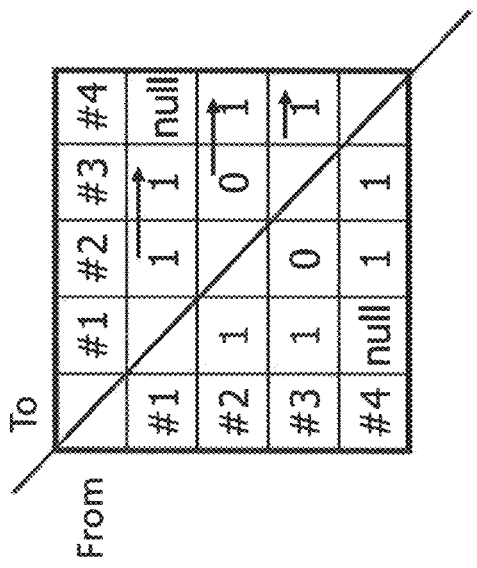
GENE 2

FIG.7C
IP TOPOLOGY
EXAMPLE: LIGHT PATH NOT FORMED 1 → 4
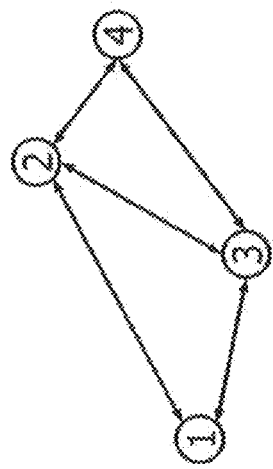
POINT-TO-POINT TRAFFIC AMOUNT : 1Gpbs
LINK GENERATION POWER PARAMETER : 30 [W/LINK]
TRAFFIC FORWARDING POWER PARAMETER : 5 [W/bps]
LINK GENERATION POWER : 150 [W]
TRAFFIC FORWARDING POWER : 130 [W]
TOPOLOGY POWER CONSUMPTION : 280 [W]
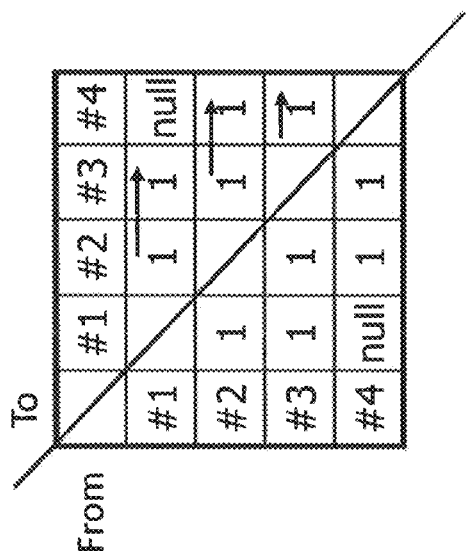
| From \ To | #1 | #2 | #3 | #4 |
|---|---|---|---|---|
| #1 | null | 1 | 1↑ | null |
| #2 | 1 | | 1 | 1↑ |
| #3 | 1 | 1 | | 1↑ |
| #4 | null | 1 | 1 | |
GENE 3
| 1 | 1 | 1 | 1 |
|---|---|---|---|
| ↑ | ↑ | ↑ | ↑ |

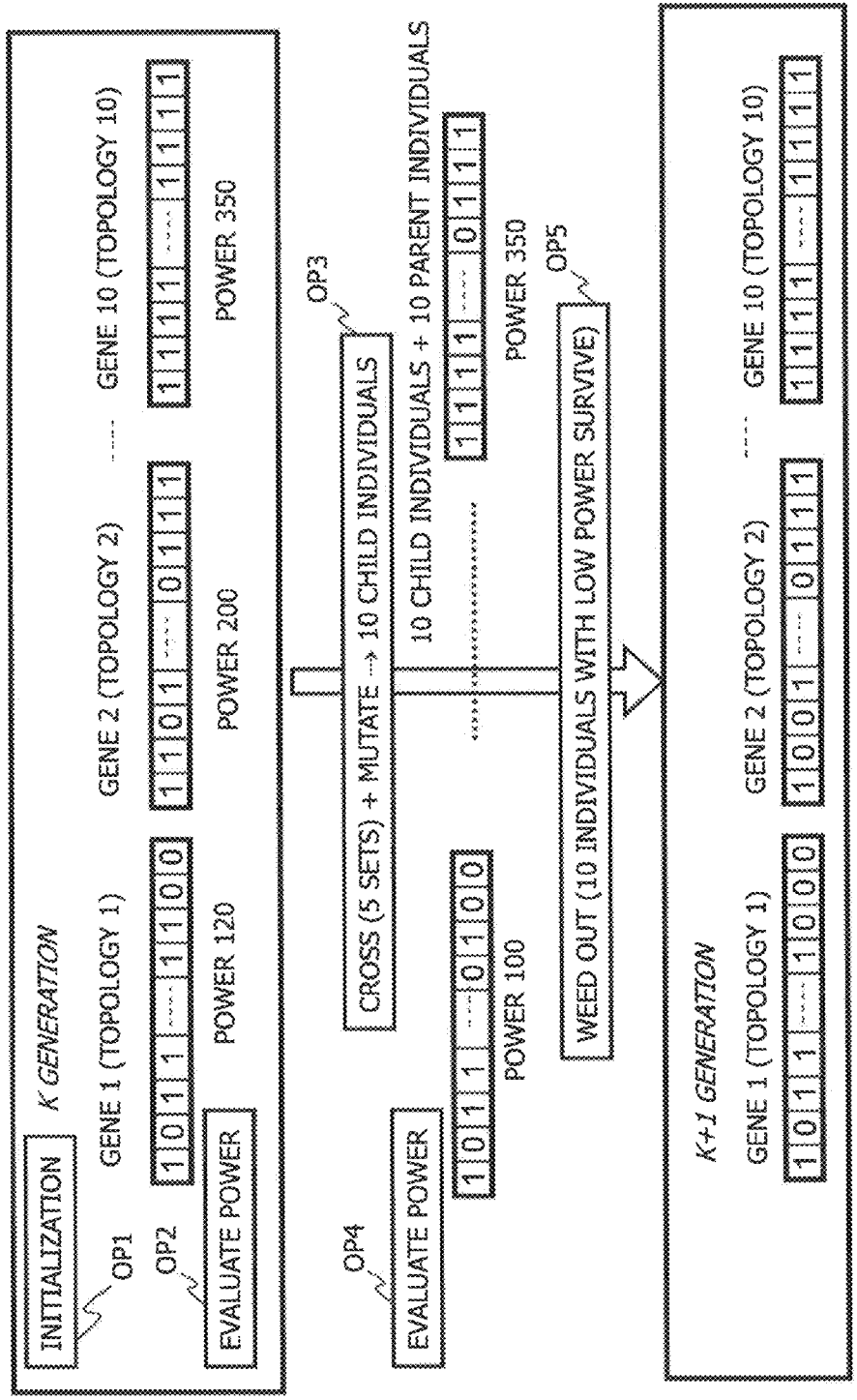

FIG.11A
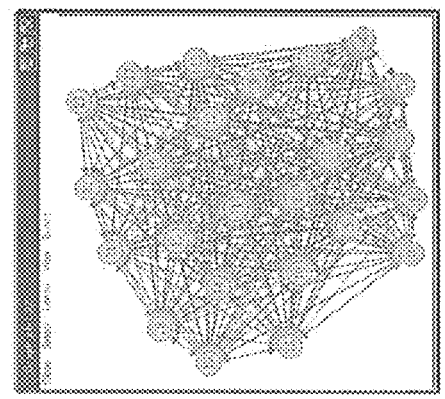
TOPOLOGY 1
IP TOPOLOGY =
PHYSICAL TOPOLOGY
12430 W
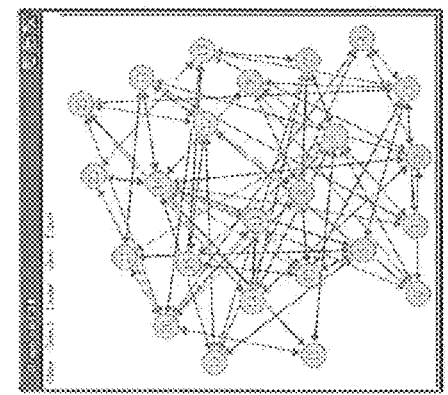
TOPOLOGY 2
DESIGN TOPOLOGY
9680 W
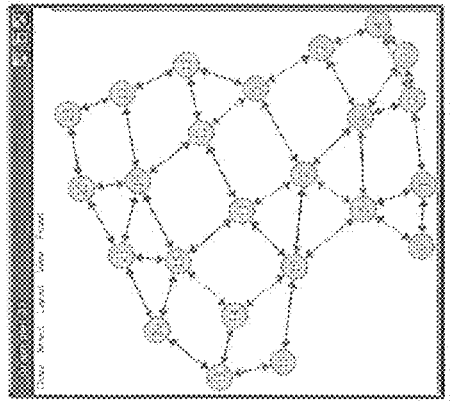
TOPOLOGY 3
FULLMESH TOPOLOGY
13920 W

US 9,059,924 B2

INFORMATION PROCESSING APPARATUS, INFORMATION PROCESSING METHOD, AND A COMPUTER-READABLE RECORDING MEDIUM RECORDING INFORMATION PROCESSING PROGRAM

CROSS-REFERENCE TO RELATED APPLICATION

This application is based upon and claims the benefit of priority of the prior Japanese Patent Application No. 2012-268418, filed on Dec. 7, 2012, the entire contents of which are incorporated herein by reference.

FIELD

The present invention relates to an information processing apparatus, an information processing method, and an information processing program for establishing a logical topology.

BACKGROUND

FIG. 1A is a diagram illustrating an example of a physical topology and an IP (Internet Protocol) topology in an optical network. In the optical network, the physical topology is formed by connections between OXCs (Optical Cross-Connect). Each OXC is connected to a router through a transponder. The OXC converts an optical signal and an electrical signal, an optical signal flows between the OXCs, and an electrical signal flows between the OXC and the router.

The transponder of the OXC and a port of the router for connection with the OXC can control on/off of the power. Therefore, a link between routers (optical direct path) is validated by turning on the transponder of the OXC and the connection port of the router. More specifically, the IP topology can be dynamically generated by dynamically turning on/off the links between the transponders of the OXCs and the connection ports of the routers. As for the connections between OXCs, on/off cannot be controlled.

In FIG. 1A, the IP topology is a topology connecting the points in a full mesh. A direct path linking a router #1 and a router #3 in the IP topology of FIG. 1A is a route through the router #1, an OXC #1, an OXC #2, an OXC #3, and the router #3 on the actual physical topology.

FIG. 1B is a diagram illustrating an example of light paths corresponding to IP links. In FIG. 1B, an IP topology 50 is formed on the physical topology illustrated in FIG. 1A. On the IP topology 50, a direct path is not formed between the router #1 and a router #4. Therefore, the paths between the router #1 and the router #4 are, for example, routes using an IP link between the router #1 and the router #3 and an IP link between the router #3 and the router #4, through the router #3. In this way, paths between two routers on the IP topology that go through another router will be called "multi-hop paths", hereinafter.

The paths between the router #1 and the router #4 on the physical topology are also routes using a path between the router #1 and the router #3 and a path between the router #3 and the router #4. Therefore, the connection port of the router #1 and the transponder of the OXC #1 as well as the connection port of the router #4 and the transponder of the OXC #4 are turned on. Furthermore, in the router #3 and the OXC #3, the connection port and the transponder for the path between the router #1 and the router #3 as well as the connection port and the transponder for the path between the router #3 and the router #4 are turned on. In the routers and the OXCs, the correspondence between the connection ports, the transponders, and the linked routers can be changed by setting.

Patent Document

[Patent document 1] Japanese Patent Laid-Open No. 2010-161501

SUMMARY

An aspect of the present invention provides an information processing apparatus in a network system including a plurality of first network apparatuses that establish logical topologies and including a plurality of second network apparatuses that connect to the first network apparatuses and that establish physical topologies, the information processing apparatus including:

a first storage unit that stores traffic amounts of paths between the first network apparatuses;

a second storage unit that stores power consumption for connections between the first network apparatuses and the second network apparatuses; and a calculation unit that calculates, for a plurality of logical topologies, sums of power consumption related to a packet forwarding process in the first network apparatuses and power consumption related to the connections between the first network apparatuses and the second network apparatuses based on the traffic amounts of the paths between the first network apparatuses and based on the power consumption for the connections and that selects a logical topology with the smallest sum among the plurality of logical topologies.

Another aspect of the present invention provides an information processing method of executing the process by the information processing apparatus. Other aspects of the present invention can include a program for causing a computer to function as the information processing apparatus and a computer-readable recording medium recording the program. The recording medium that can be read by a computer or the like denotes a recording medium that can store information, such as data and programs, by electrical, magnetic, optical, mechanical, or chemical actions and that can be read from a computer or the like.

The object and advantage of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF THE DRAWINGS

FIG. 1B is a diagram illustrating an example of light paths corresponding to IP links;

FIG. 2A is a diagram illustrating a relationship between link generation power and traffic forwarding power;

FIG. 6 is a diagram illustrating an example of a traffic matrix;

FIG. 7B is a diagram illustrating replacement of topology information with a bit string;

FIG. 7C is a diagram illustrating replacement of topology information with a bit string;

FIG. 8 is a diagram illustrating an example of an IP topology searching process based on a genetic algorithm;

FIG. 11A is a diagram illustrating topologies in an example of a simulation of the first embodiment;

BRIEF DESCRIPTION OF THE DRAWINGS

Hereinafter, embodiments of the present invention will be described based on the drawings. Configurations of the following embodiments are illustrative, and the present invention is not limited to the configurations of the embodiments.

First Embodiment

Figure 1A:
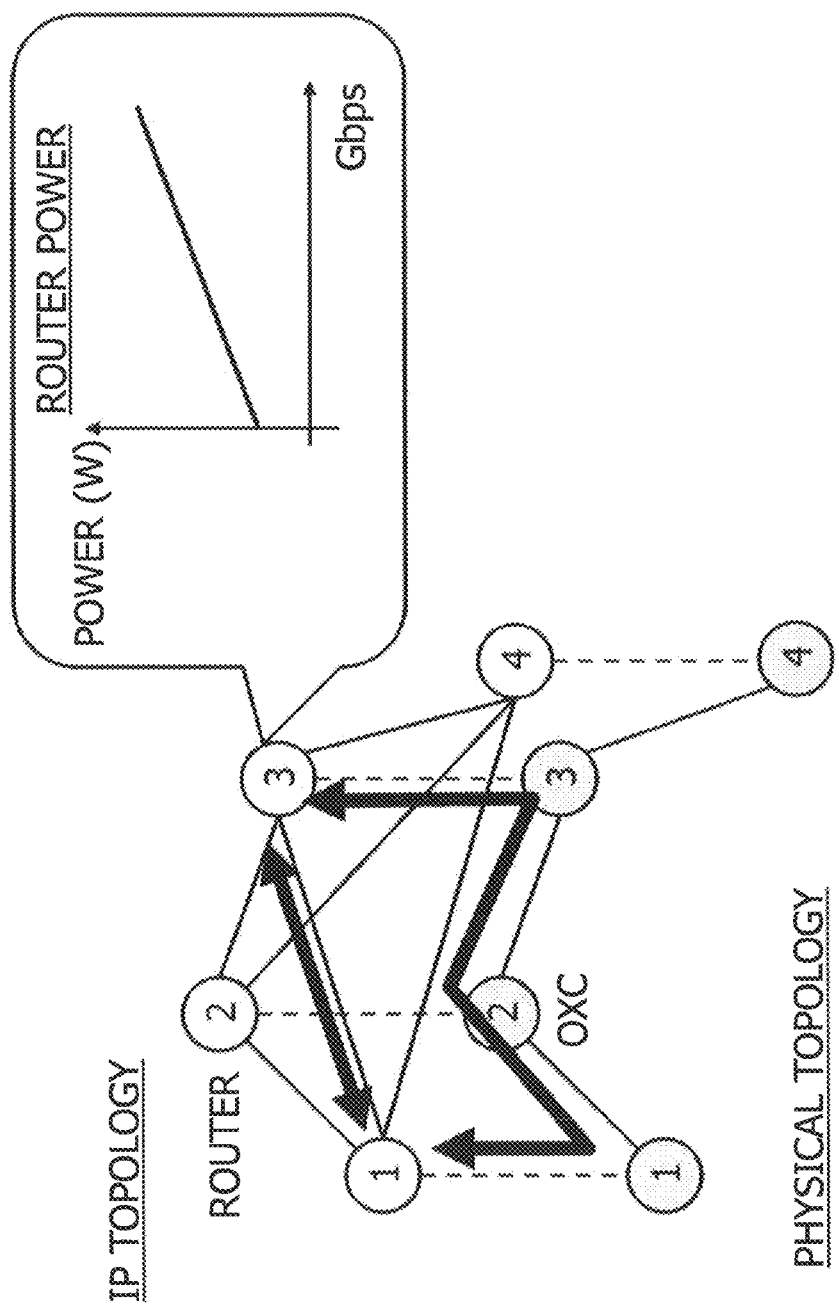
FIG. 1A is a diagram illustrating an example of a physical topology and an IP topology in an optical network.

For example, in the network system illustrated in FIG. 1, the power consumption changes in each router according to a processing traffic amount. More specifically, power for traffic forwarding increases in the router with an increase in the processing traffic amount. In an optical network, connection ports of routers and transponders of OXCs can be turned on/off to dynamically establish an IP topology. In this case, the power is consumed for the connection ports of the routers and the transponders of the OXCs in an on-state. More specifically, the power consumption of the connection ports of the routers and the transponders of the OXCs in the on-state increases with an increase in the number of IP links. Since there is no power change in an optical signal according to the traffic amount, the power consumption of the OXC generally does not change according to the traffic amount.

Hereinafter, the power for the traffic forwarding process of the routers in the IP topology will be called "traffic forwarding power". The power consumption of the connection ports of the routers and the transponders of the OXCs in the on-state in the IP topology will be called "link generation power". Furthermore, when links are simply called "links" or "the number of links", the links denote links on the IP topology.

FIG. 2A is a diagram illustrating a relationship between the link generation power and the traffic forwarding power. FIG. 2A illustrates three different IP topologies 60, 70, and 80 established by the routers #1 to #4 in the same network. The IP topology 60 is a star-type topology, in which the other routers #1, #3, and #4 are connected to the router #2. The IP topology 80 is a full-mesh-type topology, in which the routers mutually establish direct paths. The number of IP links increases in the order of the IP topology 60, the IP topology 70, and the IP topology 80.

When the number of IP links is small, the numbers of activated connection ports of routers and transponders of OXCs are small. Therefore, the link generation power is also small. However, when the number of links is small, the number of multi-hop paths increases. Therefore, the traffic amount in the router as a relay point is large. For example, in the IP topology 60, the router #2 as a center of the star type relays the traffic between the router #1 and the router #3, between the router #1 and the router #4, and between the router #3 and the router #4, and the amount of traffic to be processed is large. Therefore, when the number of IP links is small, the traffic forwarding power is large.

On the other hand, if the number of IP links is large, the number of direct paths increases, and the number of multi-hop paths decreases. The traffic amount in the router as a relay point is small. Therefore, when the number of links is large, the traffic forwarding power is small. On the other hand, if the number of links is large, the numbers of activated connection ports of routers and transponders of OXCs increase. Therefore, the link generation power is large.

As a result, among the IP topologies illustrated in FIG. 2A, the link generation power is the smallest in the IP topology 60 and the largest in the IP topology 80. The traffic forwarding power is the largest in the IP topology 60 and the smallest in the IP topology 80.

In this way, the link generation power and the traffic forwarding power are in a trade-off relationship, in which one increases with a decrease in the other.

Figure 2B:
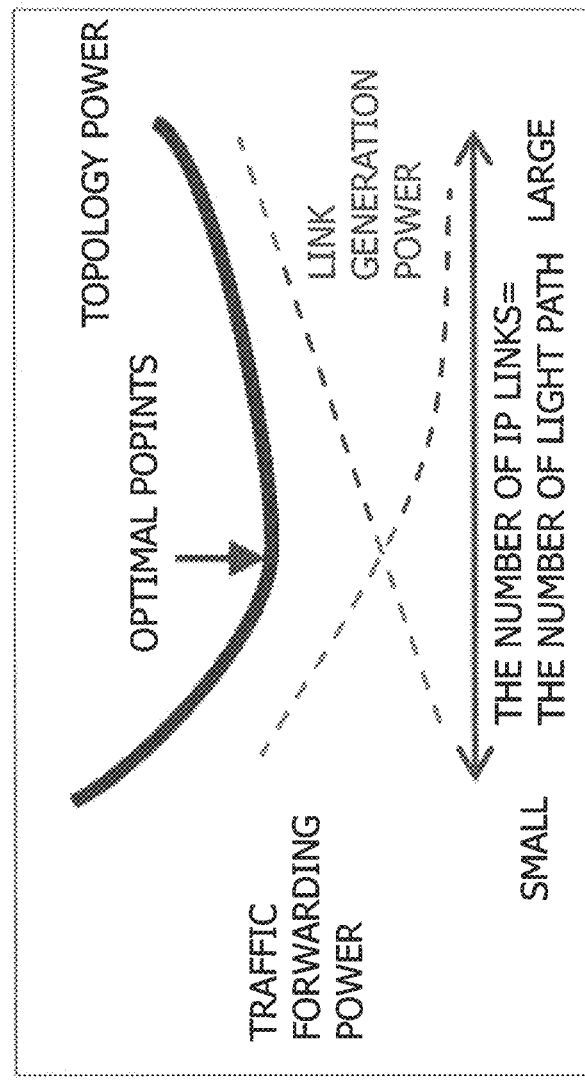
FIG. 2B is an example of a graph illustrating a relationship between the link generation power and the traffic forwarding power.

FIG. 2B is an example of a graph illustrating a relationship between the link generation power and the traffic forwarding power. As described, the link generation power and the traffic forwarding power are in the trade-off relationship. Therefore, to establish a power-saving IP topology, both of the link generation power and the traffic forwarding power are taken into account in a first embodiment.

Figure 3:
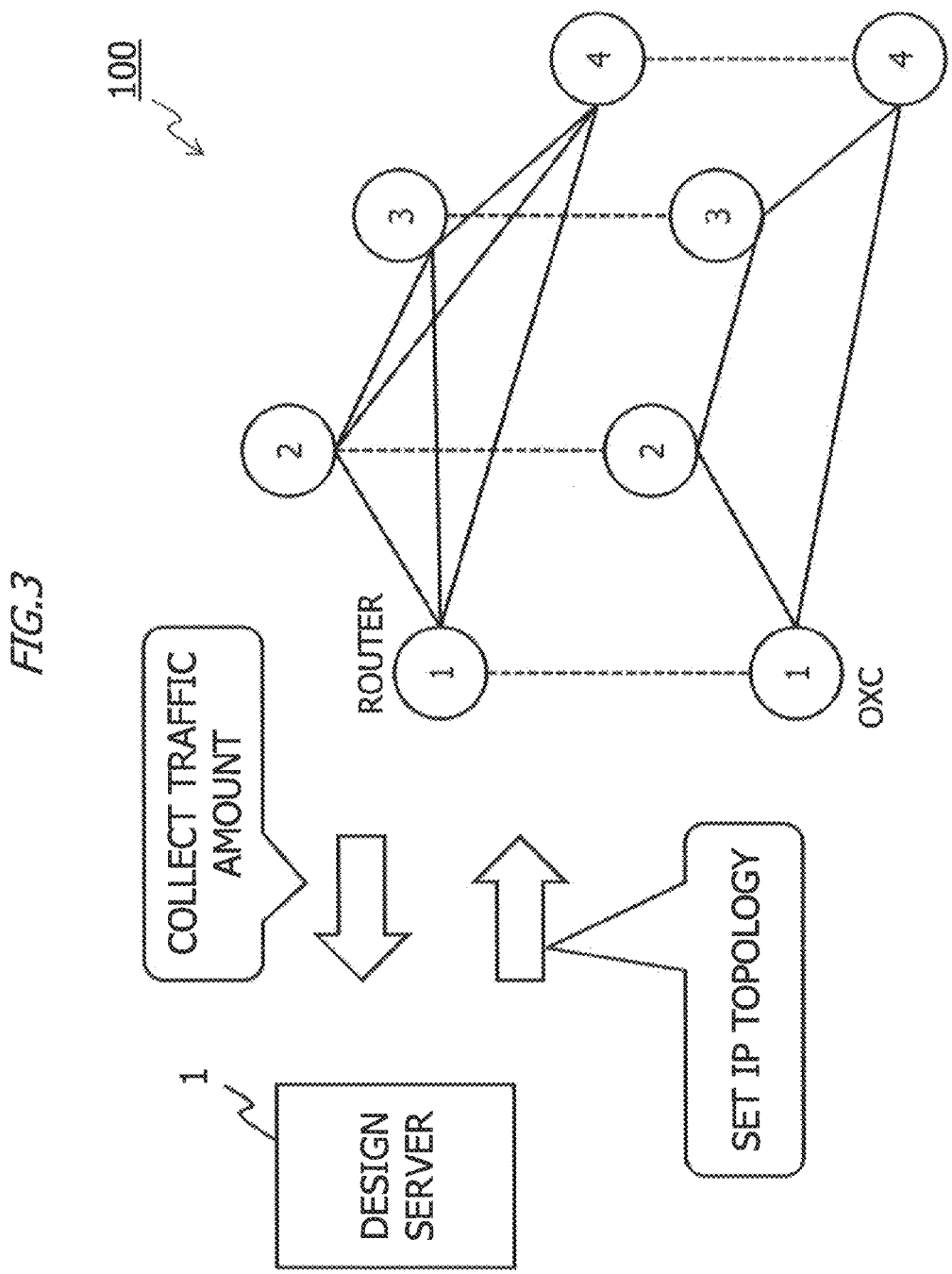
FIG. 3 is a diagram illustrating an example of a configuration of a network system according to a first embodiment.

FIG. 3 is a diagram illustrating an example of a configuration of a network system 100 according to the first embodiment. The network system 100 includes a design server 1, a plurality of routers (routers #1 to #4), and a plurality of OXCs (OXCs #1 to #4). The routers #1 to #4 and the OXCs #1 to #4 are connected to each other by connection ports and transponders. In the network system 100, the OXCs #1 to #4 establish a physical topology, and the routers #1 to #4 establish an IP topology. The design server 1 is an example of an "information processing apparatus". The router is an example of a "first network apparatus". The OXC is an example of a "second network apparatus". The IP topology is an example of a "logical topology".

The design server 1 dynamically establishes a power-saving IP topology in the network system 100. The design server 1 collects the traffic amount of each IP link from the routers #1 to #4 at a predetermined period to determine a power-saving logical topology in which the sum of the link generation power and the traffic forwarding power is the smallest. The design server 1 notifies the routers and the OXCs of the determined IP topology. When the IP topology is notified from the design server 1, the routers and the OXCs turn on or off the connection ports and the transponders between the routers and the OXCs to establish the IP topology.

Figure 4:
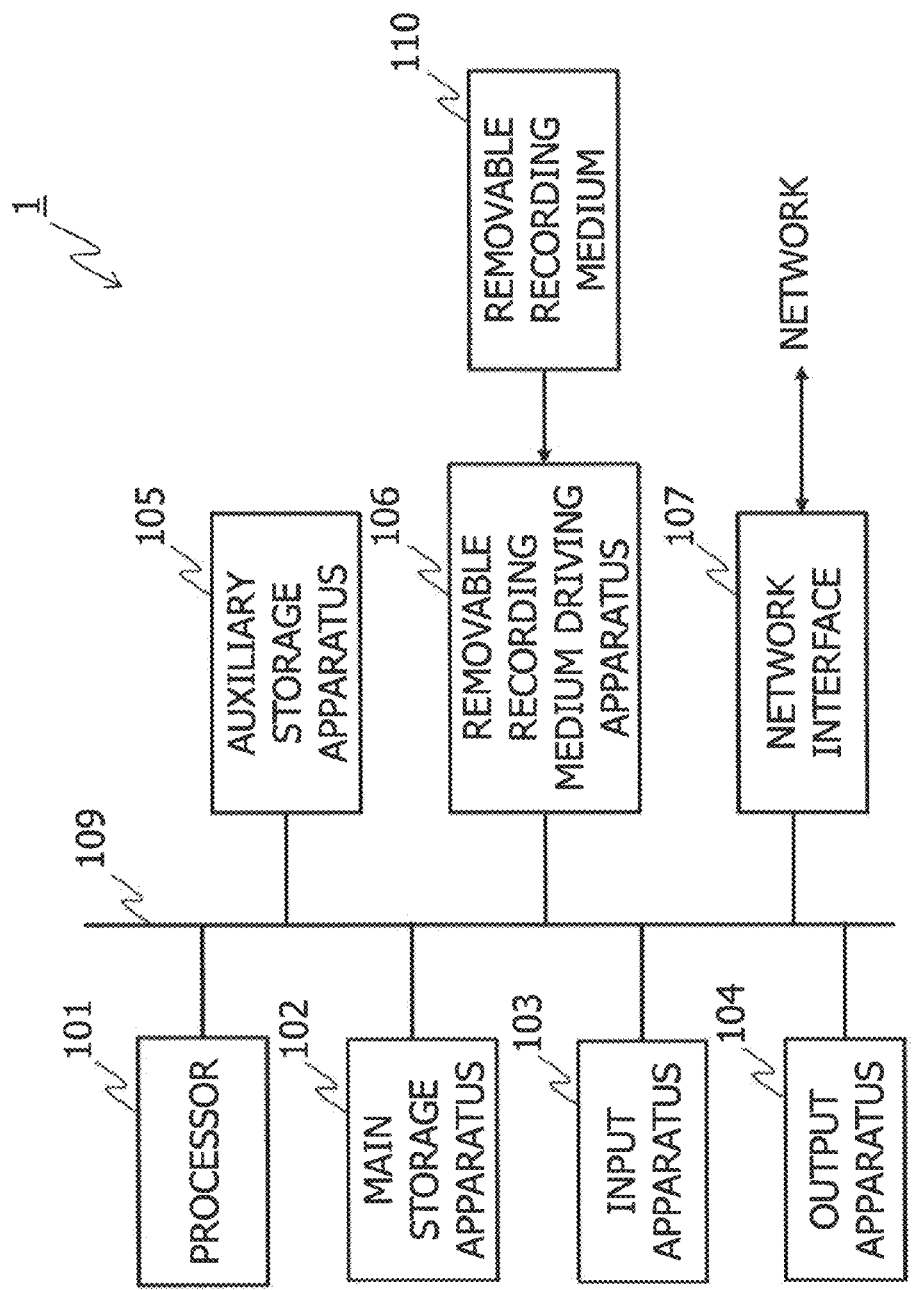
FIG. 4 is a diagram illustrating an example of a hardware configuration of a design server.

FIG. 4 is a diagram illustrating an example of a hardware configuration of the design server 1. The design server 1 is, for example, a dedicated computer as a server or a general-purpose computer. The design server 1 may be one of the routers #1 to #4. The design server 1 includes a processor 101, a main storage apparatus 102, an input apparatus 103, an output apparatus 104, an auxiliary storage apparatus 105, a removable recording medium driving apparatus 106, and a network interface 107. These are connected to each other by a bus 109.

The input apparatus 103 is a pointing device or the like such as, for example, a keyboard and a mouse. Data input from the input apparatus 103 is output to the processor 101.

The removable recording medium driving apparatus 106 reads programs and various data recorded in the removable recording medium 110 and outputs the programs and various data to the processor 101. The removable recording medium 110 is a recording medium such as, for example, an SD card, a miniSD card, a microSD card, a USB (Universal Serial Bus) flash memory, a CD (Compact Disc), a DVD (Digital Versatile Disc), and a flash memory card.

The network interface 107 is an interface for inputting and outputting information to and from the network. The network interface 107 connects to wired networks and wireless networks. The design server 1 communicates with the routers and the OXCs through the network interface 107. The network interface 107 is, for example, a NIC (Network Interface Card), a wireless LAN (Local Area Network) card, or the like. The data and the like received by the network interface 107 are output to the processor 101.

The auxiliary storage apparatus 105 stores various programs and data used by the processor 101 in the execution of the programs. The auxiliary storage apparatus 105 is, for example, a non-volatile memory, such as an EPROM (Erasable Programmable ROM) and a hard disk drive. The auxiliary storage apparatus 105 holds, for example, an operating system (OS), an IP topology design program, and various other application programs.

The main storage apparatus 102 provides the processor 101 with a storage area and a working area for loading a program stored in the auxiliary storage apparatus 105 and is also used as a buffer. The main storage apparatus 102 is, for example, a semiconductor memory, such as a RAM (Random Access Memory).

The processor 101 is, for example a CPU (Central Processing Unit). The processor 101 loads the OS or various application programs held in the auxiliary storage apparatus 105 or the removable recording medium 110 to the main storage apparatus 102 to execute various processes. The number of processors 101 is not limited to one, and a plurality of processors may be arranged.

The output apparatus 104 outputs a result of a process by the processor 101. The output apparatus 104 includes, for example, an audio output apparatus such as a speaker, a display, and a printer.

For example, in the design server 1, the processor 101 loads the IP topology design program held in the auxiliary storage apparatus 105 to the main storage apparatus 102 to execute the IP topology design program. The design server 1 collects the traffic amount of each IP link from each router, obtains a power-saving IP topology and notifies each router and each OXC of the power-saving IP topology through the execution of the IP topology design program. The hardware configuration of the design server 1 is an example, and the hardware configuration is not limited to this. Constituent elements can be appropriately omitted, replaced, or added according to embodiments. The IP topology design program may be recorded in, for example, the removable recording medium 110. The IP topology design program is an example of an "information processing program".

Figure 5:
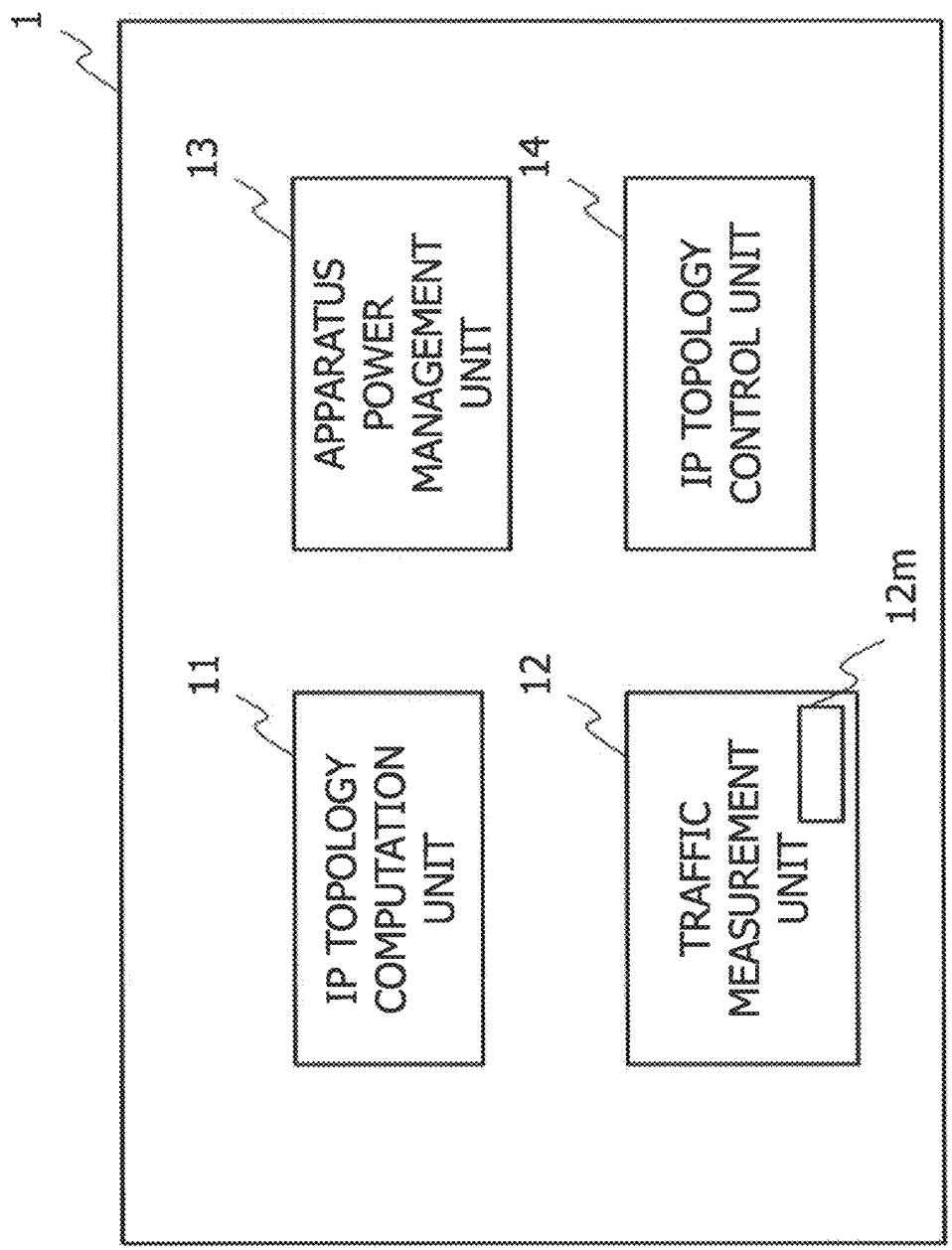
FIG. 5 is a diagram illustrating an example of functional blocks of the design server according to the first embodiment.

FIG. 5 is a diagram illustrating an example of functional blocks of the design server 1 according to the first embodiment. For example, as the processor 101 executes the IP topology design program stored in the auxiliary storage apparatus 105, the design server 1 operates as an IP topology computation unit 11, a traffic measurement unit 12, an apparatus power management unit 13, and an IP topology control unit 14. The functional blocks of the design server 1 may be achieved not only by software processing of the processor 101, but may also be achieved by hardware. For example, the hardware that achieves the functional blocks of the design server 1 can be an LSI (Large Scale Integration), an FPGA (Field-Programmable Gate Array), or the like.

The apparatus power management unit 13 holds, for example, power characteristic information of each router, port power consumption information of each router, and transponder power consumption information of each OXC. The power characteristic information of each router is, for example, power for a forwarding process per unit data amount (hereinafter, "traffic forwarding power parameter [W/Gbps]"). The port power consumption information of each router is, for example, power consumption in the on-state per connection port of the router for connection with the OXC (hereinafter, "IP port power parameter [W/port]"). The transponder power consumption information of each OXC is, for example, power consumption in the on-state per transponder of the OXC (hereinafter, "transponder forwarding power parameter [W/transponder]").

The apparatus power management unit 13 is, for example, part of the storage area of the main storage apparatus 102. For example, when the IP link (optical direct path) between the router #1 and the router #2 illustrated in FIG. 3 is valid, the connection port of the router #1 and the transponder of the OXC #1 as well as the connection port of the router #2 and the transponder of the OXC #2 are turned on. Therefore, the power for generating one IP link is a sum of the power consumption of the connection ports of two routers and the power consumption of the transponders of two OXCs. The power characteristic information of each router, the port power consumption information of each router, and the transponder power consumption information of each OXC may be held by being input in advance by a manager, for example, or may be held by being acquired from each apparatus when a power MIB (Management Information Base) or the like is set in each apparatus. The apparatus power management unit 13 is an example of a "second storage unit".

The traffic measurement unit 12 collects traffic information of each IP link from each router. For example, the traffic information is periodically collected using an SNMP (Simple Network Management Protocol) or the like. The traffic information is collected at a period of every five minutes, every ten minutes, or the like, for example. The traffic information is, for example, counter information of a transmission packet of each destination IP address in the connection port of each router for connection with the OXC. The traffic measurement unit 12 calculates the traffic amount of each IP link from the traffic information collected from each router to generate a traffic matrix.

FIG. 6 is a diagram illustrating an example of the traffic matrix. The points denote the routers. For example, when the traffic information collected from each router is counter information (pieces/second) of a transmission packet of each destination IP address in the connection port for connection with the OXC, the traffic amount from one router to another router is obtained by counter information (pieces/second)×size of one packet (bit). The traffic matrix is stored in, for example, a storage unit 12m. The storage unit 12m is, for example, part of the storage area of the main storage apparatus 102. The storage unit 12m may also hold the physical topology of the network system 100. The storage unit 12m is an example of a "first storage unit".

The IP topology control unit 14 notifies the routers and the OXCs of the IP topology determined by the IP topology computation unit 11. The IP topology control unit 14 notifies the routers of the IP topology by, for example, notifying the routers of routing information. The IP topology control unit 14 notifies the OXCs of the IP topology by, for example, notifying the OXCs of the setting of allocation of wavelengths and light paths between the OXCs.

Based on the traffic amount of each link, the IP topology computation unit 11 searches for an IP topology that reduces the sum of the link generation power and the traffic forwarding power. In the first embodiment, the IP topology computation unit 11 expresses topology information by a bit string and uses a genetic algorithm to search for the IP topology. The IP topology computation unit 11 is an example of a "calculation unit".

The genetic algorithm is a method of obtaining fitness of randomly generated N (N: positive integer) individuals (current generation) by an evaluation function to generate new individuals by crossing and mutation between the individuals of the current generation to select N individuals (next generation) from the generated individuals and obtaining a solution by repeating this G times (G: positive integer). The IP topology computation unit 11 uses bit strings indicating the IP topologies as the individuals and uses power consumption of topology, i.e. the sum of the link generation power and the traffic forwarding power, as the fitness to search for the IP topology based on the genetic algorithm.

(Generation of Bit String)

Figure 7A:
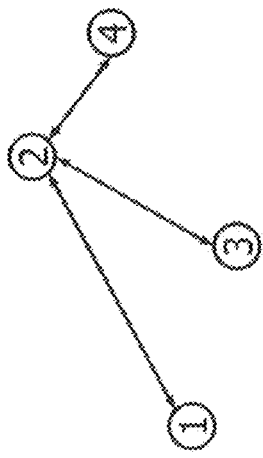
FIG. 7A is a diagram illustrating an example of replacement of topology information with a bit string.

FIGS. 7A, 7B, and 7C are diagrams illustrating examples of replacement of topology information with a bit string. The bit string serves as an individual in the genetic algorithm. The physical topology is common in FIGS. 7A, 7B, and 7C, and four routers and four OXCs establish the physical topology. However, the OXCs are omitted in FIGS. 7A, 7B, and 7C. In FIGS. 7A, 7B, and 7C, it is assumed that the transmission distance of the router #1 and the router #4 is long, and an optical direct path is not established.

The IP topology computation unit 11 first generates a link matrix indicating presence/absence of the generation of links (optical direct paths) between points (routers). In the link matrix, a component between points with the generation of a link is "1", and a component between points without the generation of a link is "0". A component between points in which a direct path is not established due to a reason such as the distance between the points is too long is "null". In FIGS. 7A, 7B, and 7C, the direct path is not established between the router #1 and the router #4. Therefore, the component corresponding to the router #1 (From) and the router #4 (To) and the component corresponding to the router #4 (From) and the router #1 (To) are "null". The link matrix is symmetric because the component derived by exchanging From (row) and To (column) indicates the same link.

The bit string indicating the topology information is generated by, for example, arranging the components of the link matrix in which the components that are overlapped due to the symmetry and the components "null" are removed. In the network illustrated in FIGS. 7A, 7B, and 7C, the components corresponding to the router #1 (From) and the router #2 (To), the router #1 (From) and the router #3 (To), the router #2 (From) and the router #3 (To), the router #2 (From) and the router #4 (To), and the router #3 (From) and the router #4 (To) are arranged in this order to generate the bit string. However, the generation of the bit string is not limited to this.

In the example illustrated in FIG. 7A, the router #1, the router #3, and the router #4 form links with the router #2 and do not form links with the routers other than the router #2. Therefore, the bit string of the IP topology illustrated in FIG. 7A is "10110".

In the example illustrated in FIG. 7B, links are generated between the router #1 and the router #2, between the router #2 and the router #4, between the router #4 and the router #3, and between the router #3 and the router #1. Therefore, the bit string of the IP topology illustrated in FIG. 7B is "11011".

In the example illustrated in FIG. 7C, links are generated except between the router #1 and the router #4. Therefore, the bit string of the IP topology illustrated in FIG. 7C is "11111".

(Calculation of Topology Power Consumption)

After generating the bit string from the topology information, the topology computation unit 11 calculates power consumption of topology. The topology power consumption serves as the fitness in the genetic algorithm. The power consumption of topology is obtained as a sum of the link generation power and the traffic forwarding power.

First, the link generation power is obtained using the transponder power consumption information and the port power consumption information held in the apparatus power management unit 13.

When one IP link (direct path) is generated, the connection ports of two routers and the transponders of two OXCs are turned on. For example, when the IP port power parameters of the routers are the same and the transponder power parameters of the OXCs are the same, the link generation power is obtained by the number of IP links×2×(IP port power parameter+transponder power parameter).

In FIGS. 7A, 7B, and 7C, it is assumed that the IP port power parameters of the routers are the same and that the transponder power parameters of the OXCs are the same. It is also assumed that the link generation power parameter=2×(IP port power parameter+transponder power parameter)=30 (W/link). In this case, since the IP topology illustrated in FIG. 7A includes three IP links, the link generation power is 30 (W/link)×3 (links)=90 (W). Since the IP topology illustrated in FIG. 7B includes four IP links, the link generation power is 30 (W/link)×4 (links)=120 (W). Since the IP topology illustrated in FIG. 7C includes five IP links, the link generation power is 30 (W/link)×5 (links)=150 (W).

Next, the traffic forwarding power is obtained as follows, for example.

(1) Shortest routes between the points are calculated.
(2) The traffic amounts between the points acquired from the traffic matrix are added to the routers on the shortest routes between the points to obtain traffic amounts flowing over the routers.
(3) The traffic forwarding power parameter (W/Gbps) in the routers is multiplied by the forwarding traffic amounts of the routers to calculate router forwarding power for traffic forwarding of the routers. The sum of the router forwarding power of the routers is calculated as the traffic forwarding power.

The calculation of the traffic forwarding power of the IP topology of FIG. 7A will be described, in which, for example, the traffic amounts between the points are uniformly 1 Gbps, and the traffic forwarding power parameter of the routers is 5 (W/Gbps).

In FIG. 7A, the shortest routes between the points are obtained as follows. The traffic amount between the points is 1 Gbps.

Router #1→router #2
Router #1→router #2→router #3
Router #1→router #2→router #4

Router #2→router #1
Router #2→router #3
Router #2→router #4
Router #3→router #2→router #1
Router #3→router #2
Router #3→router #2→router #4
Router #4→router #2→router #1
Router #4→router #2
Router #4→router #2→router #3

The traffic amount between the points is 1 Gbps, and the forwarding traffic amounts processed by the routers of FIG. 7A are as follows.

Router #1: 6 Gbps
Router #2: 12 Gbps
Router #3: 6 Gbps
Router #4: 6 Gbps

Therefore, the router forwarding power of the routers and the total amount of the power, i.e. the traffic forwarding power of the IP topology of FIG. 7A, are as follows.

Router #1: 6 [Gbps]×5[W/Gbps]=30 [W]
Router #2: 12 [Gbps]×5[W/Gbps]=60 [W]
Router #3: 6 [Gbps]×5[W/Gbps]=30 [W]
Router #4: 6 [Gbps]×5[W/Gbps]=30 [W]
Traffic forwarding power: 30 [W]+60 [W]+30 [W]+30 [W]=150 [W].

Similarly, the traffic forwarding power of the IP topologies of FIGS. 7B and 7C is also obtained. It is assumed that the traffic forwarding power of the IP topology of FIG. 7B is 140 W and that the traffic forwarding power of the IP topology of FIG. 7C is 130 W.

Once the link generation power and the traffic forwarding power are calculated, the sum of these serves as the power consumption of topology. The power consumption of the IP topology illustrated in FIG. 7A is link generation power 90 [W]+traffic forwarding power 150 [W]=240 [W]. The power consumption of the IP topology illustrated in FIG. 7B is link generation power 120 [W]+traffic forwarding power 140 [W]=260 [W]. The power consumption of the IP topology illustrated in FIG. 7C is link generation power 150 [W]+traffic forwarding power 130 [W]=280 [W].

(IP Topology Searching Process Based on Genetic Algorithm)

FIG. 8 is a diagram illustrating an example of an IP topology searching process based on the genetic algorithm. The IP topology computation unit 11 uses the bit strings generated from the IP topologies as the individuals in the genetic algorithm and uses the power consumption of the IP topologies as the fitness.

The IP topology computation unit 11 selects, for example, ten individuals, i.e. IP topologies replaced by bit strings, as a K generation (OP1: initialize). When K=1, i.e. first generation, the IP topology computation unit 11 randomly generates ten individuals (bit strings). When K=2 or greater, i.e. second and subsequent generations, ten individuals (bit strings) as a result of selection of a K−1 generation are used.

Next, the IP topology computation unit 11 obtains power consumption of topology for the ten individuals (OP2: evaluate power). The calculation process of the power consumption of topology is as described above. Next, the IP topology computation unit 11 selects two individuals from the ten individuals to form one set and selects five sets to rearrange the individuals of the sets (crossing) to invert the bits (mutation) to generate ten child individuals (OP3: cross, mutate).

For example, the crossing and the mutation denote generation of child individuals AA and AB by exchanging part of parent individuals A and B (crossing) and further inverting part of the bit string (mutation).

For example, when second to fourth bits of a parent individual A: 11001 and a parent individual B: 10010 are exchanged and crossed, a child individual AA': 10011 and a child individual AB': 11000 are generated. Furthermore, when third bits of the child individual AA': 10011 and the child individual AB': 11000 are inverted and mutated, a child individual AA: 10111 and a child individual AB: 11100 are generated. In this way, the IP topology computation unit 11 generates two child individuals AA and AB from two parent individuals A and B. The IP topology computation unit 11 performs this for five sets of parent individuals to generate ten child individuals. The generation method of the child individuals in this case, i.e. the method of crossing and mutation, is not limited to one specific method, and any known method may be used.

The IP topology computation unit 11 obtains power consumption of topology for the newly generated ten child individuals (OP4: evaluate power). The IP topology computation unit 11 selects ten individuals with small power consumption of topology from twenty individuals including ten parent individuals and ten child individuals (OP5: weed out). The selected ten individuals serve as individuals of a K+1 generation.

The IP topology computation unit 11 repeats the IP topology searching process based on the genetic algorithm for ten generations, for example. Among the ten individuals selected by weeding out the tenth generation, the IP topology computation unit 11 selects an individual with the smallest power consumption of topology as an IP topology applied to the network system 100.

(Flow of Process)

Figure 9:
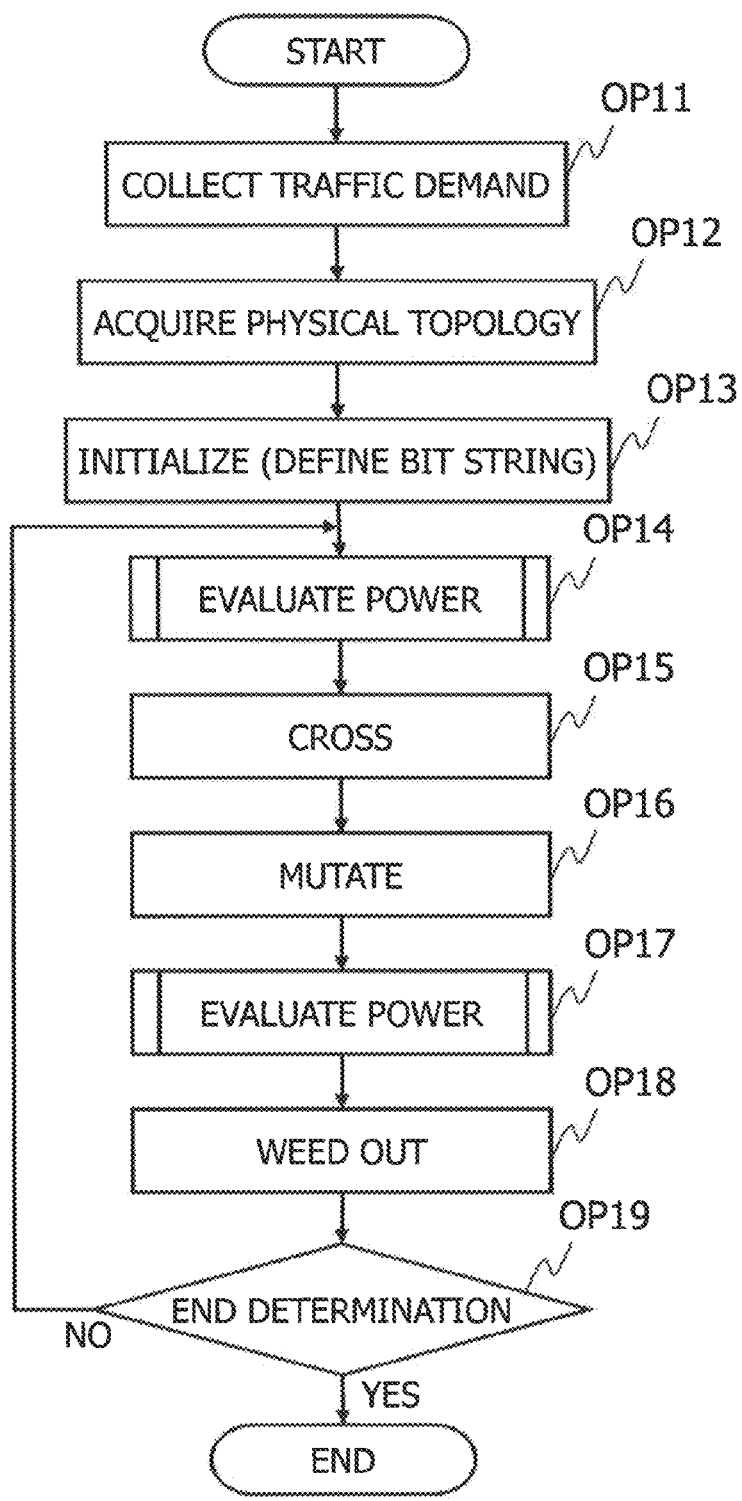
FIG. 9 is a diagram illustrating an example of a flow chart of a process by an IP topology computation unit.

FIG. 9 is an example of a flow chart of a process by the IP topology computation unit 11. The flow chart illustrated in FIG. 9 is executed, for example, when an event as a trigger occurs or at a predetermined period. The event as a trigger is, for example, a change or the like in the physical topology of the network, such as addition or deletion of a router or an OXC. The predetermined period is, for example, every five minutes and every one hour.

In OP11, the IP topology computation unit 11 reads the traffic matrix from the storage unit 12m, and collects the traffic amounts (traffic demands) between the IP links. In OP12, the IP topology computation unit 11 acquires the physical topology. For example, the physical topology may be acquired based on information of the connection relationship (for example, routing information) collected from the routers along with the traffic information to acquire the physical topology based on the information, or may be set by the manager in advance. For example, the physical topology may be stored in the storage unit 12m along with the traffic matrix, or may be stored in part of the storage area of the main storage apparatus 102 different from the traffic matrix. The physical topology is used for the detection between points (routers) that do not form direct paths.

OP13 to OP18 are an IP topology searching process based on the genetic algorithm. In OP13, the IP topology computation unit 11 defines ten bit strings corresponding to ten randomly selected IP topologies. In OP14, the IP topology computation unit 11 calculates power consumption of topology for the ten IP topologies to evaluate power. In OP15 and OP16, the IP topology computation unit 11 selects five sets of two individuals from the ten IP topologies and crosses and mutates the individuals of each set to generate ten child individuals. In OP17, the IP topology computation unit 11 calculates power consumption of topology for the ten newly generated child individuals to evaluate power. In OP18, ten individuals with small power consumption are selected from the ten parent individuals and the ten child individuals to weed out the individuals.

In OP19, the IP topology computation unit 11 determines whether an end condition is satisfied. The end condition is, for example, end of the IP topology searching process based on the genetic algorithm for ten generations. If the end condition is satisfied (OP19: Yes), the process illustrated in FIG. 9 ends. If the end condition is not satisfied (OP19: No), i.e. if the IP topology searching process based on the genetic algorithm is not performed for ten generations for example, the process returns to OP14, and the IP topology searching process based on the genetic algorithm is repeated.

Although ten parent individuals and ten child individuals are used in the IP topology searching process based on the genetic algorithm in the first embodiment, the arrangement is not limited to this. The numbers of parent individuals and child individuals are appropriately set according to the scale (such as the number of points) of the network. The numbers of parent individuals and child individuals may not be the same. Although the IP topology searching process based on the genetic algorithm is executed for ten generations in the first embodiment, the number of repetitions of the process is not limited to ten.

Figure 10:
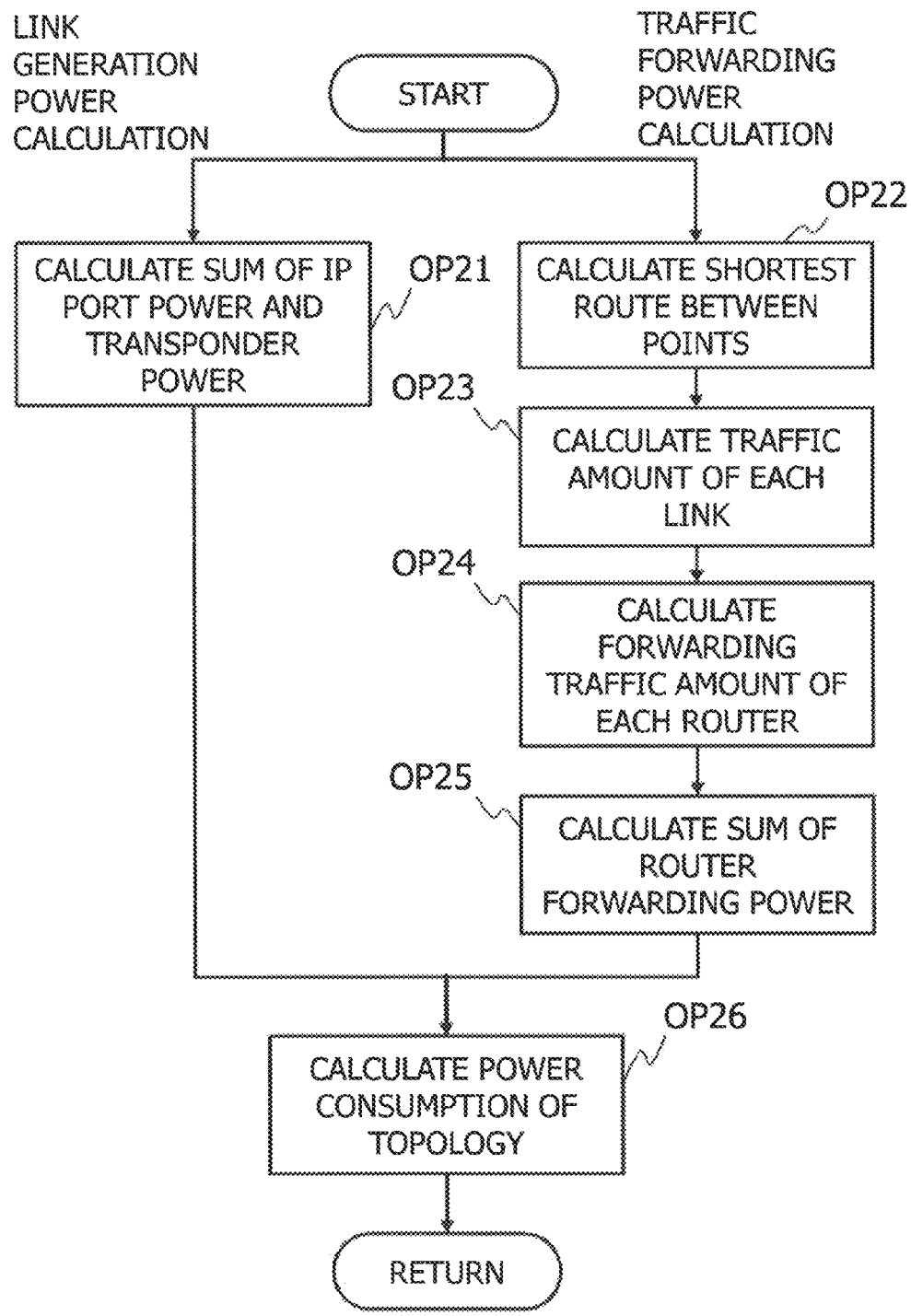
FIG. 10 is a diagram illustrating an example of a flow chart of a power evaluation process of OP14 and OP17 illustrated in FIG. 9.

FIG. 10 is an example of a flow chart of the power evaluation process of OP14 and OP17 illustrated in FIG. 9. The flow chart illustrated in FIG. 10 is executed for each selected individual (IP topology).

OP21 indicates a calculation process of link generation power. In OP21, the IP topology computation unit 11 calculates a sum of the total power consumption of the connection ports of the routers in the on-state ("IP port power" in FIG. 10) and the total power consumption of the transponders of the OXCs in the on-state ("transponder power" in FIG. 10) as the link generation power.

OP22 to OP25 indicate a calculation process of traffic forwarding power. In OP22, the IP topology computation unit 11 calculates shortest routes between the points. In OP23, the IP topology computation unit 11 acquires traffic amounts between the points from the traffic matrix to calculate the flowing traffic amount of each IP link. In OP24, the IP topology computation unit 11 calculates the forwarding traffic amount of each router from the traffic amount flowing over the IP link. In OP25, the IP topology computation unit 11 calculates the router forwarding power of each router and calculates a sum of the router forwarding power as the traffic forwarding power.

In OP26, a sum of the link generation power calculated in OP21 and the traffic forwarding power calculated in OP25 is calculated as power consumption of the topology. Subsequently, the process illustrated in FIG. 10 ends.

Although the calculation process of the link generation power and the calculation process of the traffic forwarding power are executed in parallel in FIG. 10, the arrangement is not limited to this. The link generation power and the traffic forwarding power may be calculated in this order or may be calculated in the opposite order.

(Operation and Effect of First Embodiment)

FIG. 11A is a diagram illustrating topologies in an example of a simulation of the first embodiment. FIG. 11A illustrates establishment of IP topologies in a network with 24 points. A topology 1 is the same topology as the physical topology. A topology 2 is a topology designed by the design server 1 according to the first embodiment. A topology 3 is a full-mesh topology.

In the simulation illustrated in FIG. 11A, design conditions are set as follows.
Traffic amounts between points (traffic matrix): all 1 Gbps
Link generation power parameter: 30 [W/link]
Traffic forwarding power parameter: 5 [W/Gbps]

The link generation power parameter is power for generating one IP link and is (IP port power parameter+transponder power parameter)×2.

In the simulation illustrated in FIG. 11A, the number of alternations of generations of bit strings is set to 3000 episodes, the crossing rate is set to 0.5, and the mutation rate is set to 0.007.

Figure 11B:
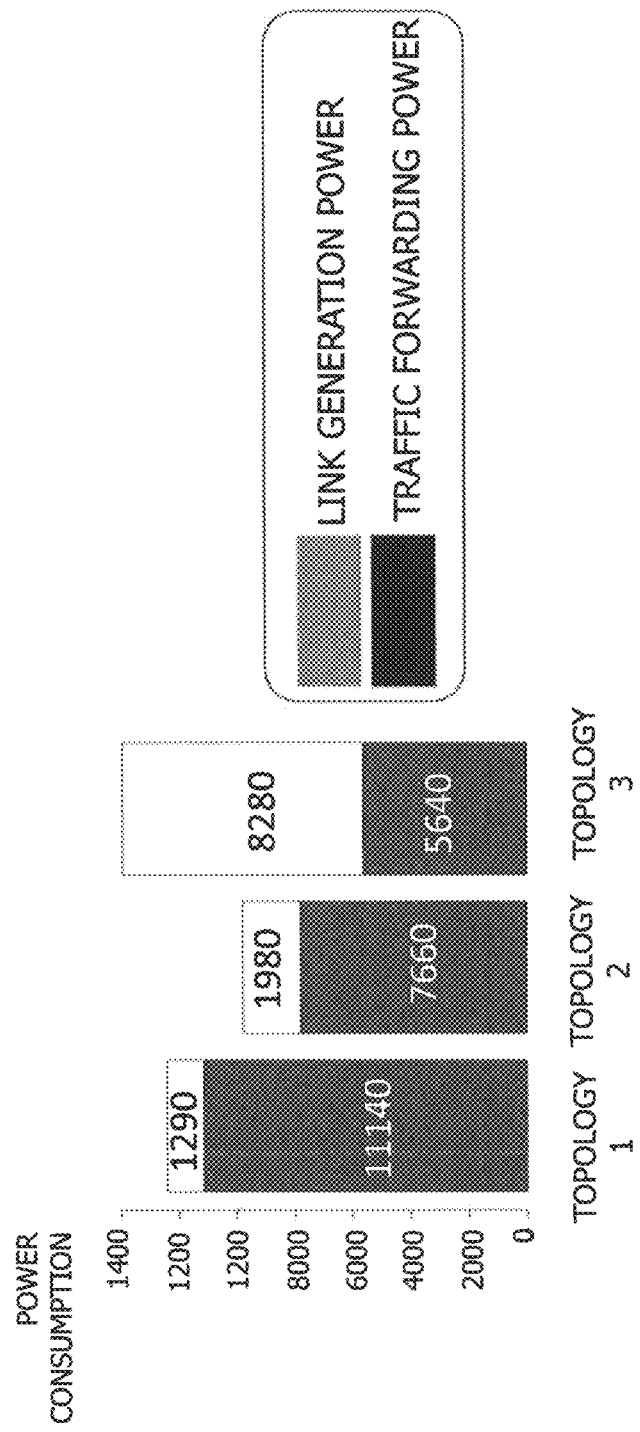
FIG. 11B is a diagram illustrating a comparison of simulation results of the topologies illustrated in FIG. 11A.

FIG. 11B is a diagram illustrating a comparison of simulation results of the topologies illustrated in FIG. 11A. The simulation results of the topologies are as follows.
Topology 1 (IP topology=physical topology)
  Link generation power: 1290 [W] (43 links)
  Traffic forwarding power: 11140 [W]
  Topology power consumption: 12430 [W]
Topology 2 (IP topology=design topology)
  Link generation power: 1980 [W] (66 links)
  Traffic forwarding power: 7660 [W]
  Topology power consumption: 9680 [W]
Topology 3 (IP topology=full mesh)
  Link generation power: 8280 [W] (276 links)
  Traffic forwarding power: 5640 [W]
  Topology power consumption: 13920 [W]

Therefore, it can be recognized that the power consumption of the topology 2, i.e. the IP topology designed by the design server 1 of the first embodiment, is the smallest. The link generation power of the topology 2 alone and the traffic forwarding power of the topology 2 alone are not the smallest among the three topologies. However, the sum of the traffic forwarding power and the link generation power, i.e. the power consumption of the topology, of the topology 2 is the smallest. Therefore, according to the first embodiment, the trade-off relationship between the link generation power and the traffic forwarding power can be taken into account to establish a power-saving IP topology.

Furthermore, a power-saving IP topology can be more efficiently established by replacing the IP topology with the bit string, setting the power consumption of the topology as the fitness, and using the genetic algorithm to search for the IP topology.

According to the embodiment, the logical topology for which the power consumption is smaller can be established in consideration of the trade-off relationship between the power consumption for the packet forwarding process and the power consumption for connections between the network apparatuses in the logical network.

Second Embodiment

The number of ports held by the router is limited, and the number of direct paths that can be established by the router is also limited. In a second embodiment, the design server 1 takes into account an upper limit of the number of ports held by each router, i.e. the number of IP links that can be established by each router, to establish a power-saving IP topology. In the second embodiment, the description overlapping with the first embodiment will be omitted.

In the second embodiment, the configuration of the design server 1 is in common with the first embodiment. The second embodiment is different from the first embodiment in that the fitness to be used is changed when there is an individual exceeding the number of links among the selected individuals (IP topologies) in the searching process of IP topology based on the genetic algorithm. The fitness in the second embodiment will be called a topology metric.

Figure 12:
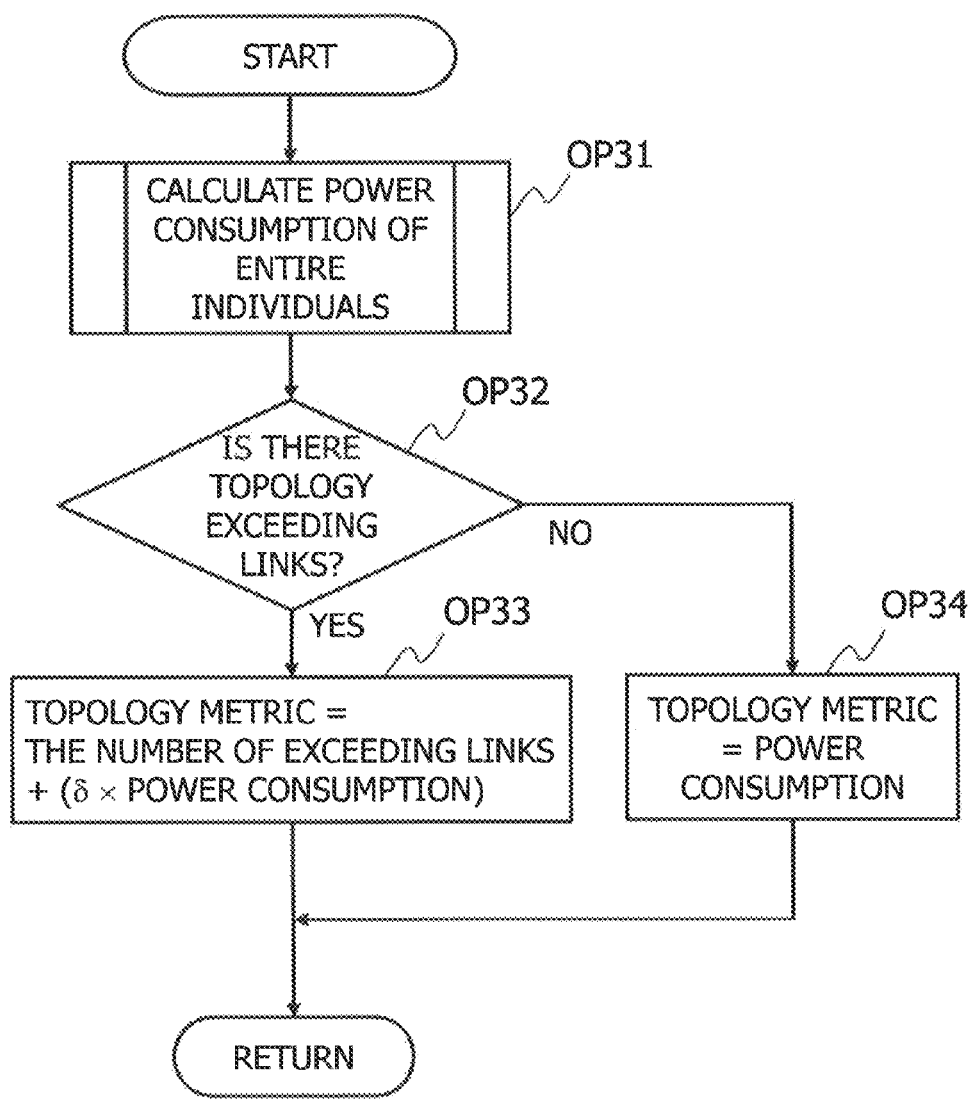
FIG. 12 is a diagram illustrating an example of a flow chart of a power evaluation process according to a second embodiment.

FIG. 12 is an example of a flow chart of a power evaluation process according to the second embodiment. The flow chart illustrated in FIG. 12 is equivalent to the process of power evaluation in OP14 and OP17 illustrated in FIG. 9.

In OP31, the IP topology computation unit 11 executes OP21 to OP26 illustrated in FIG. 10 for each individual (IP topology) to calculate the power consumption of the entire individuals.

In OP32, the IP topology computation unit 11 determines whether there is a topology exceeding the number of links among the selected ten individuals (OP14) or twenty individuals (OP17). The determination is based on, for example, the configuration information including the number of held ports of each router (upper limit in the number of links) and the link matrix (see FIGS. 7A to 7C).

For example, it is assumed that the upper limit in the number of links of each router is two in FIG. 7A. In this case, the link matrix includes three "1" in the row or column of the router #2, indicating that the number of links established by the router #2 is three. The link matrix includes two or less "1" in the rows or columns of the routers #1, #3, and #4, indicating that the links are not establishing by exceeding the upper limit in the number of links. Therefore, the number of exceeding links of the IP topology illustrated in FIG. 7A is one.

The configuration information of router may be collected from each router based on the SNMP or the like, or the manager may set the configuration information of the router in advance, for example. The configuration information of router may be held in the device power management unit 13 or may be held in part of the storage area of the main storage apparatus 102 different from the apparatus power management unit 13.

If there is a topology exceeding the number of links (OP32: Yes), the topology metric is set as follows for all topologies (OP33). δ denotes a minute constant, wherein 0<δ, and δ×power consumption<1.

Topology metric=the number of exceeding links+(δ× power consumption)

If there is no topology exceeding the number of links (OP32: No), the power consumption is set as the topology metric for all topologies (OP34).

After OP33 and OP34, the size of the topology metric determines individuals (IP topologies) to be selected or weeded out (see FIG. 9). Specifically, ten individuals with small topology metric are selected.

In this way, in the second embodiment, when there is a topology exceeding the number of links, the design server 1 scales the topology metric to the size according to the number of exceeding links. As a result, an IP topology with a greater number of exceeding links has a greater topology metric, and IP topologies with fewer numbers of exceeding links are selected.

(Operation and Effect of Second Embodiment)

Figure 13A:
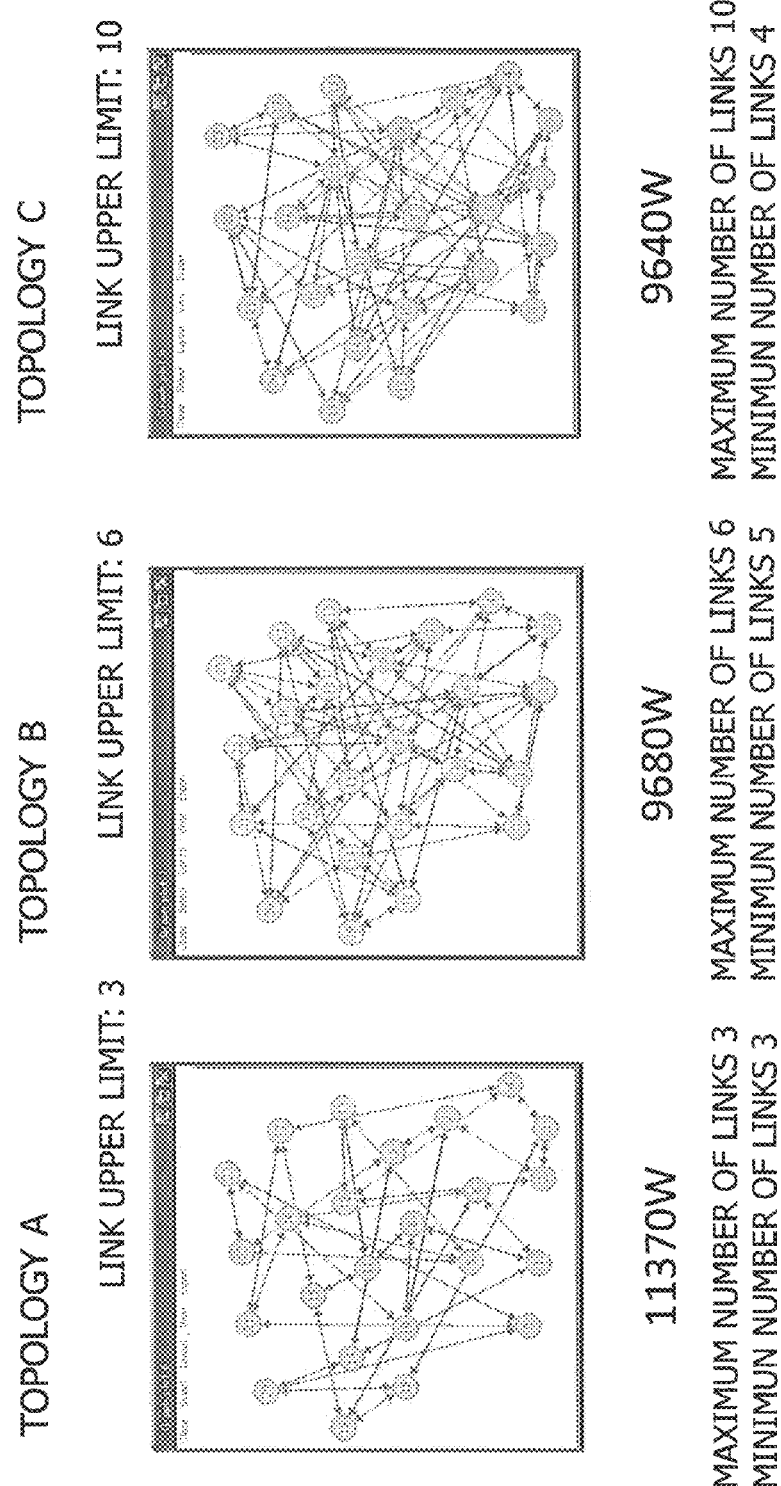
FIG. 13A is a diagram illustrating topologies in an example of a simulation of the second embodiment.

FIG. 13A is a diagram illustrating topologies in an example of a simulation of the second embodiment. FIG. 13A illustrates establishment of IP topologies in a network with 24 points. Topologies 1 to 3 are IP topologies designed by the design server 1 of the second embodiment. However, link upper limits of the routers are different in the topologies 1 to 3. In the topology 1, the link upper limit of the routers is three. In the topology 2, the link upper limit of the routers is six. In the topology 3, the link upper limit of the routers is ten.

In the simulation illustrated in FIG. 13A, design conditions are set as follows.
  Traffic amounts between points (traffic matrix): all 1 Gbps
  Link generation power parameter: 30 [W/link]
  Traffic forwarding power parameter: 5 [W/Gbps]
  The link generation power parameter is power for generating one IP link and is (IP port power parameter+transponder power parameter)×2.

In the simulation illustrated in FIG. 13A, the number of alternations of generations of bit strings is set to 3000 episodes, the crossing rate is set to 0.5, and the mutation rate is set to 0.007.

Figure 13B:
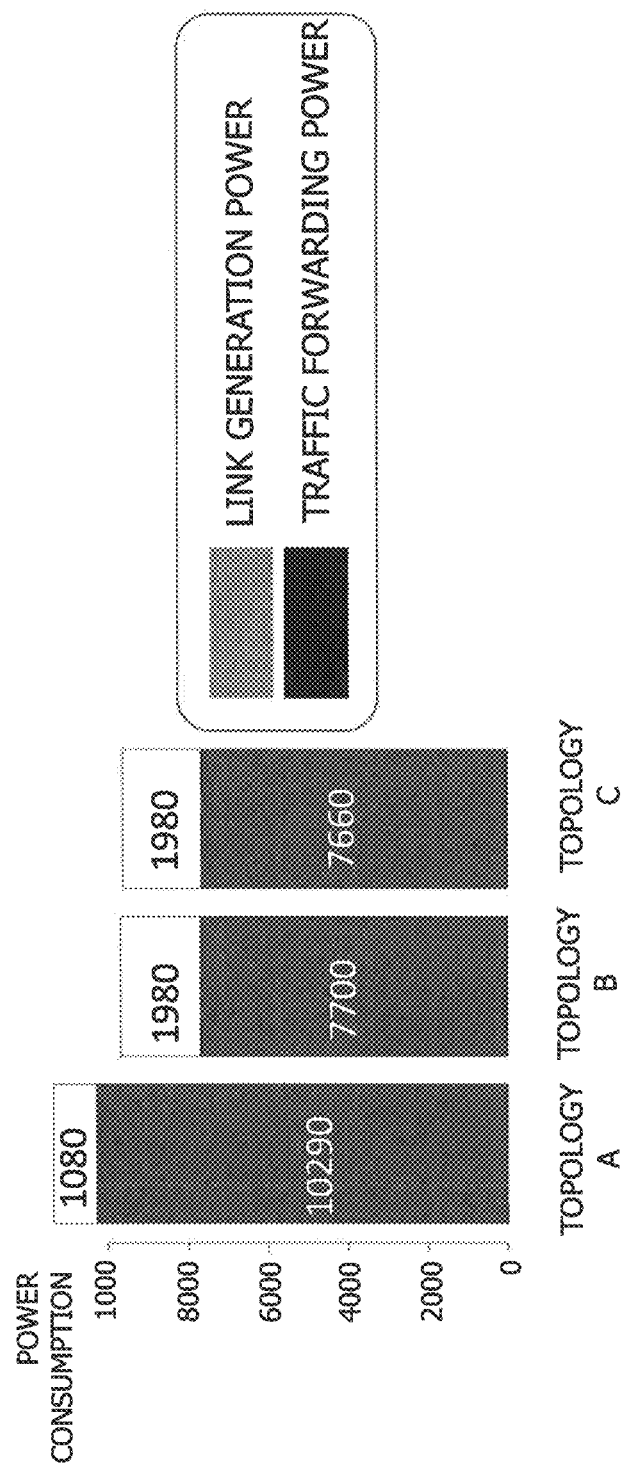
FIG. 13B is a diagram illustrating a comparison of simulation results of the topologies illustrated in FIG. 13A.

FIG. 13B is a diagram illustrating a comparison of simulation results of the topologies illustrated in FIG. 13A. The simulation results of the topologies are as follows.

Topology 1 (link upper limit: 3)
  Link generation power: 1080 [W] (36 links)
  Traffic forwarding power: 10290 [W]
  Topology power consumption: 11370 [W]
  Maximum number of links included in router: 3
  Minimum number of links included in router: 3

Topology 2 (link upper limit: 6)
  Link generation power: 1980 [W] (66 links)
  Traffic forwarding power: 7700 [W]
  Topology power consumption: 9680 [W]
  Maximum number of links included in router: 6
  Minimum number of links included in router: 5

Topology 3 (link upper limit: 10)
  Link generation power: 1980 [W] (66 links)
  Traffic forwarding power: 7660 [W]
  Topology power consumption: 9640 [W]
  Maximum number of links included in router: 10
  Minimum number of links included in router: 4

Therefore, according to the design server of the second embodiment, a power-saving IP topology that satisfies the link upper limit of the routers can be established in any of the topologies 1 to 3.

<Others>

In the first and second embodiments, the power-saving IP topology is searched using the genetic algorithm. However, the arrangement is not limited to this, and for example, the design server 1 may obtain the power consumption for all IP topologies to specify the IP topology with the smallest power consumption.

In the description of the first and second embodiments, the routers are assumed to be the first network apparatuses that establish the logical topologies, and the OXCs are assumed to be the second network apparatuses that establish the physical topologies. However, the arrangement is not limited to this, and the first and second embodiments can also be applied to, for example, a combination of routers or MPLS (Multi-Protocol Label Switching) apparatuses as the first network apparatuses that establish the logical topologies and WDM (Wavelength Division Multiplexing) transmission apparatuses as the second network apparatuses that establish the physical topologies. The first and second embodiments can also be applied to, for example, a combination of apparatuses (routers, servers, or the like) that establish tunneling as the first network apparatuses that establish the logical topologies and routers as the second network apparatus that establish the physical topologies.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more the embodiments of the present invention have been described in detail, it should be understood that the various changes, substitutions, and alterations could be made hereto without departing from the spirit and scope of the invention.

What is claimed is:

1. An information processing apparatus in a network system including at least three first network apparatuses that establish logical topologies including available logical paths and including a plurality of second network apparatuses that connect to the first network apparatuses and that establish physical topologies, the information processing apparatus comprising:
a first storage unit that stores traffic amounts of each of the logical paths between the first network apparatuses, each of the logical paths being available by each of the second network apparatuses and each of ports of the first network apparatuses connecting to each of the second network apparatuses turning on;
a second storage unit that stores power consumption for each of connections between the first network apparatuses and the second network apparatuses; and
a calculation unit that calculates, for a plurality of logical topologies established by the first network apparatuses, sums of power consumption related to a packet forwarding process between the first network apparatuses and power consumption related to the connections between the first network apparatuses and the second network apparatuses based on the traffic amounts of each of the logical paths between the first network apparatuses and based on the power consumption for each of the connections and that selects a logical topology with the smallest sum among the plurality of logical topologies, wherein the power consumption related to the connections increases in association with increment of number of the logical paths, and the power consumption related to the packet forwarding process decreases in association with increment of number of the logical paths.

2. An information processing apparatus in a network system including a plurality of first network apparatuses that establish logical topologies and including a plurality of second network apparatuses that connect to the first network apparatuses and that establish physical topologies, the information processing apparatus comprising:
a first storage unit that stores traffic amounts of paths between the first network apparatuses;
a second storage unit that stores power consumption for connections between the first network apparatuses and the second network apparatuses; and
a calculation unit that calculates, for a plurality of logical topologies, sums of power consumption related to a packet forwarding process in the first network apparatuses and power consumption related to the connections between the first network apparatuses and the second network apparatuses based on the traffic amounts of the paths between the first network apparatuses and based on the power consumption for the connections and that selects a logical topology with the smallest sum among the plurality of logical topologies,
wherein
the calculation unit determines the logical topology with the smallest sum by repeating, for G times (G: positive integer), a process of selecting M sets (M: positive integer) of logical topologies, each set including two logical topologies, from N (N: positive integer) logical topologies, newly generating, for each set, two logical topologies based on the two logical topologies to generate 2M logical topologies, calculating the sums for the N logical topologies and the 2M logical topologies, and selecting N logical topologies in which the sums are small among the N logical topologies and the 2M logical topologies.

3. The information processing apparatus according to claim 2, wherein
the calculation unit replaces the logical topologies with bit strings expressing connection relationships between the first network apparatuses by 1 and 0 and executes the process for the bit strings.

4. The information processing apparatus according to claim 3, wherein
the calculation unit does not include connections between unconnectable first network apparatuses in the bit strings.

5. The information processing apparatus according to claim 1, wherein
the calculation unit selects a logical topology that does not exceed an upper limit in the number of links of each of the first network apparatuses and in which the sum is smaller, among the plurality of logical topologies.

6. The information processing apparatus according to claim 5, wherein
when a logical topology including a first network apparatus with a link exceeding the upper limit in the number of links is included in the plurality of logical topologies, the calculation unit calculates a metric from the sum and the number of exceeding links for each logical topology and selects a logical topology with the smallest metric.

7. An information processing method in a network system including at least three first network apparatuses that establish logical topologies including available logical paths and including a plurality of second network apparatuses that connect to the first network apparatuses and that establish physical topologies, the information processing method executed by a computer comprising:
storing traffic amounts of each of the logical paths between the first network apparatuses in a first storage unit, each of the logical paths being available by each of the second network apparatuses and each of ports of the first network apparatuses connecting to each of the second network apparatuses turning on;
storing power consumption for each of connections between the first network apparatuses and the second network apparatuses in a second storage unit; and
calculating, for a plurality of logical topologies established by the first network apparatuses, sums of power consumption related to a packet forwarding process between the first network apparatuses and power consumption related to the connections between the first network apparatuses and the second network apparatuses based on the traffic amounts of each of the logical paths between the first network apparatuses and based on the power consumption for each of the connections and selecting a logical topology with the smallest sum among the plurality of logical topologies, wherein the power consumption related to the connections increases in association with increment of number of the logical paths, and the power consumption related to the packet forwarding process decreases in association with increment of number of the logical paths.

8. A non-transitory computer-readable recording medium recording an information processing program in a network system including at least three first network apparatuses that establish logical topologies including available logical paths and including a plurality of second network apparatuses that connect to the first network apparatuses and that establish physical topologies, the information processing program executed by a computer comprising:

storing traffic amounts of each of the logical paths between the first network apparatuses in a first storage unit, each of the logical paths being available by each of the second network apparatuses and each of ports of the first network apparatuses connecting to each of the second network apparatuses turning on;

storing power consumption for each of connections between the first network apparatuses and the second network apparatuses in a second storage unit; and calculating, for a plurality of logical topologies established by the first network apparatuses, sums of power consumption related to a packet forwarding process between the first network apparatuses and power consumption related to the connections between the first network apparatuses and the second network apparatuses based on the traffic amounts of each of the logical paths between the first network apparatuses and based on the power consumption for each of the connections and selecting a logical topology with the smallest sum among the plurality of logical topologies, wherein the power consumption related to the connections increases in association with increment of number of the logical paths, and the power consumption related to the packet forwarding process decreases in association with increment of number of the logical paths.

* * * * *